United States Patent [19]

Hess

[11] Patent Number: 5,239,357
[45] Date of Patent: Aug. 24, 1993

[54] APPARATUS FOR MEASURING VARIATIONS IN WINDINGS OF COILED MATERIAL

[75] Inventor: Jerome E. Hess, Valparaiso, Ind.

[73] Assignee: Bethlehem Steel Corporation, Bethlehem, Pa.

[21] Appl. No.: 756,024

[22] Filed: Sep. 6, 1991

[51] Int. Cl.$^5$ .................. G01N 21/88; G01B 11/28
[52] U.S. Cl. .............................. 356/237; 33/DIG. 3; 356/379
[58] Field of Search ............... 356/237, 239, 244, 432, 356/379; 33/560, 561.1, DIG. 3

[56] References Cited

U.S. PATENT DOCUMENTS

| | | | |
|---|---|---|---|
| 241,241 | 5/1881 | Ruge | 33/561.1 |
| 1,041,145 | 10/1912 | Moss | 33/561.1 |
| 2,721,391 | 10/1955 | Von Duyke | 33/561.1 |
| 3,539,923 | 11/1970 | Tsergas | 324/546 |
| 3,727,123 | 4/1973 | Smith | 324/546 |
| 3,769,576 | 10/1973 | Norkaitis | 324/546 |
| 3,840,301 | 10/1974 | Pryor et al. | 356/376 |
| 4,832,495 | 5/1989 | Briggs et al. | 356/379 |

FOREIGN PATENT DOCUMENTS

| | | | |
|---|---|---|---|
| 0307677 | 12/1989 | Japan | 324/546 |
| 1019540 | 2/1966 | United Kingdom | 356/379 |

Primary Examiner—Vincent P. McGraw
Attorney, Agent, or Firm—Harold I. Masteller, Jr.

[57] ABSTRACT

Apparatus for measuring lap to lap variations between windings of a coiled sheet product comprising a light source, a light measuring cell, and a light directing chamber located between the light source and the light measuring cell. The light directing chamber includes a cavity adapted to receive a shutter, and a light directing duct having a slot communicating with the cavity of the light directing chamber. The slot is adapted to provide an opening for inserting the shutter into the interior portion of the light directing duct.

5 Claims, 3 Drawing Sheets

APPARATUS FOR MEASURING VARIATIONS IN WINDINGS OF COILED MATERIAL

BACKGROUND OF THE INVENTION

It has become conventional practice, in manufacturing rolled sheet products, to wind the product onto coiling mandrels after any one of a variety of processing steps such as cold rolling, temper rolling, annealing or slitting into smaller strands. In order to insure that the product is wound evenly onto the mandrel, several considerations must be made with respect to the alignment of the product with the manufacturing line. For example, the moving sheet product must be controlled to run evenly along the centerline of the rolling mill and, at the coiling end of the line, the product must approach the coiling mandrel at a proper angle to insure even winding of the coils. The establishment and maintenance of this mill alignment criteria is critical to prevent lap to lap variations of the finished coiled product which can result in product damage from either the coiling equipment or collisions with other coils. Additionally, when unevenly wound coils are placed on their ends for either storage or shipping, damage to the coil ends is likely to occur.

It is therefore necessary for the operators of a sheet rolling mill to maintain proper adjustment and alignment of the sheet product between the processing unit and the coiler. Heretofore an operator was not expected to spend much time on precise calculations and measurements to produce evenly wound coils. More than likely operators would resort to their experience in determining the quality of the coil windings and would adjust the mill alignment accordingly. Such instinctive setup methods may work reasonably well for experienced operators but they provide little or no guidance for new inexperienced operators.

SUMMARY OF THE INVENTION

It is therefore an object of this invention to provide a device capable of quickly indicating the quality of the coil windings on a finished coiled sheet product.

It is a further object of this invention to provide a device for measuring the lap to lap variations of the windings on a finished coiled sheet product.

It is still a further object of this invention to provide a measuring device which can be calibrated to meet the coil winding tolerances of any given sheet rolling mill.

And finally, it is still a further object of this invention to provide a coil winding measuring device capable of indicating when it is necessary to readjust the alignment of the sheet product along the center line of the rolling mill to achieve a proper approach angle between the processing unit and the coiler.

We have discovered that the foregoing objects can be attained with apparatus for measuring lap to lap variations between windings of a coiled sheet product comprising a light source housed within a chamber having a first panel member including a plurality of apertures extending therethrough, a light measuring means housed within a chamber having a second panel member, parallel to said first panel member, and including one or more apertures extending therethrough, a light directing chamber located between the light source and the light measuring means the light directing chamber including a cavity adapted to receive a shutter, and a light directing duct including a slot communicating with the cavity of the light directing chamber, the slot being adapted to provide means for inserting the shutter into the interior portion of the light directing duct.

DETAILED DESCRIPTION OF THE INVENTION

Figure 1:
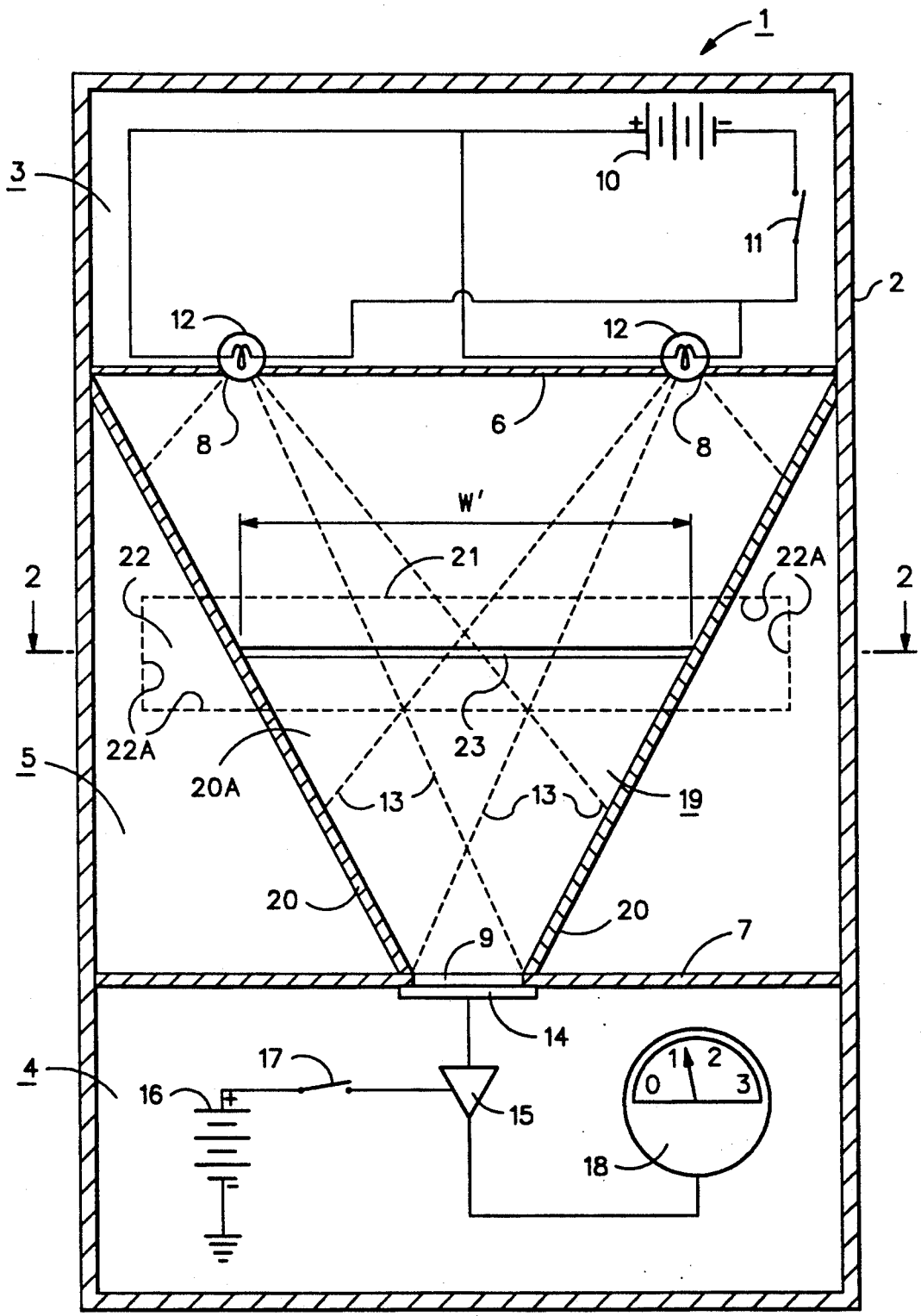
FIG. 1 is an elevational view in cross-section showing the coil winding measuring device of the invention.

Referring to FIG. 1 of the drawings, the preferred embodiment of the invention is shown as a coil winding measuring device 1 comprising a closed box like housing 2 having a light source chamber 3 at one end, a light receiving chamber 4 at the opposite end, and a light directing chamber 5 located between the light source and the light receiving chambers. The light source chamber 3 and the light directing chamber 5 are separated by a panel 6 and the light receiving chamber 4 and the light directing chamber 5 are separated by a second panel 7. Panel 6 includes a plurality of apertures communicating between chambers 3 and 5 and panel 7 includes one or more apertures 9 communicating between chambers 5 and 4.

Enclosed within the light source chamber 3 is an electrical circuit having a power source 10 and a switch 11 for controlling the power to light bulbs 12. Light bulbs 12 are positioned within apertures 8 to emit light 13 into the light directing chamber 5 which is constructed in a manner to direct the light, emitted from bulbs 12, through apertures 9 and into the light receiving chamber 4.

Enclosed within the light receiving chamber 4 is an electrical circuit comprising at least one solar cell 14 positioned to receive and convert into electricity, the light emitted from bulbs 12. An amplifier 15, attached to a power source 16 and a switch 17, increases the level of the current received from the solar cell and the amplified current is conducted to a meter 18 which indicates the level of the amplified current which is analogous to the amount of light falling onto the solar cell 14.

Although FIG. 1 shows the light source circuit and the light receiving circuit as having separate power sources, it should be understood that the two circuits could be attached to a single power source and control switch.

The light directing chamber 5, located between the light source and light receiving chambers 3 and 4, includes a light directing duct or conduit 19 housed within chamber 5 and extending between the parallel panels 6 and 7 of the measuring device. Duct 19 captures apertures 8 and 9 within its side walls 20, 20A and 20B and the side walls are arranged in a shape similar to a frustum of a pyramid converging toward aperture 9 providing means for directing light 13 through aperture 9 and onto solar cell 14.

Figure 2:
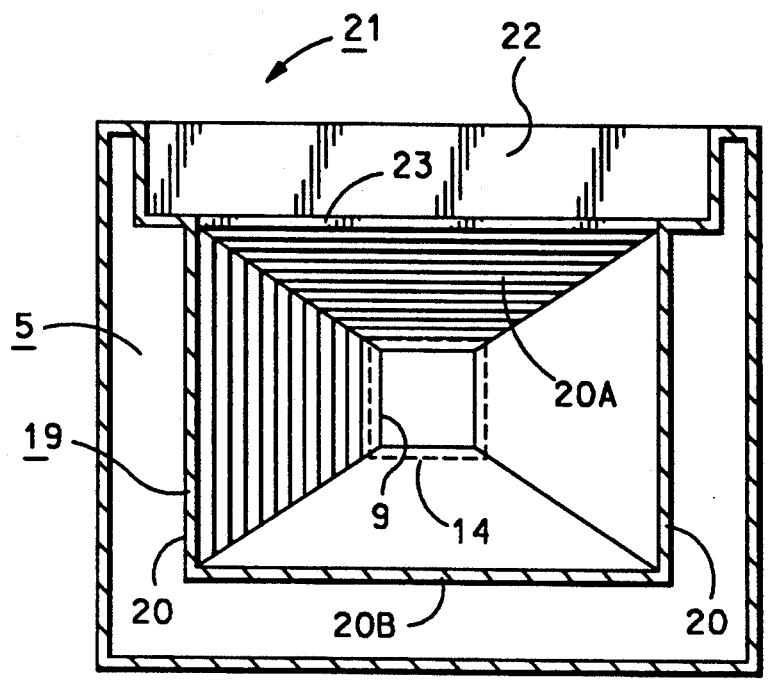
FIG. 2 is a cross-sectional view taken along the lines 2—2 of FIG. 1.
Figure 3:
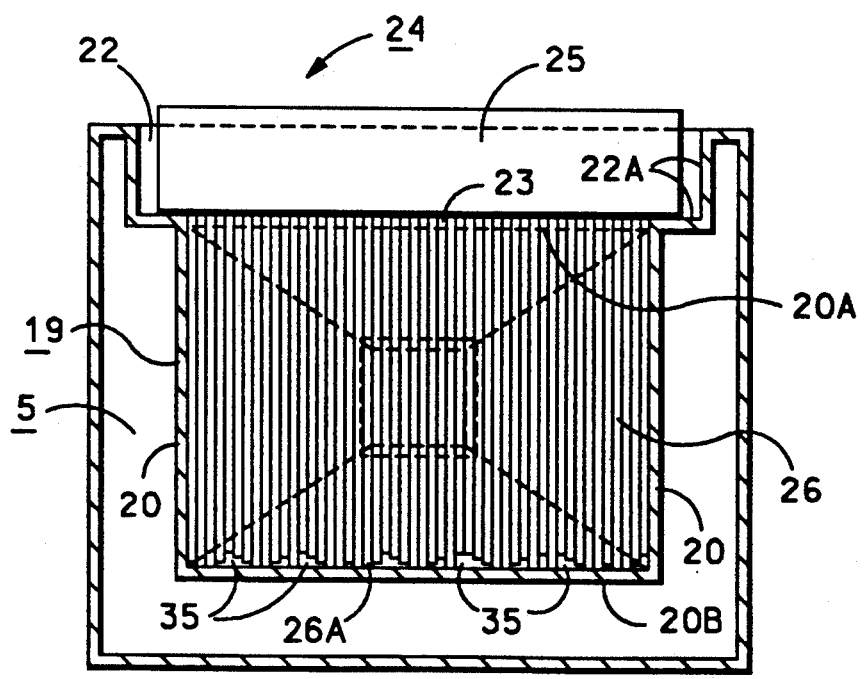
FIG. 3 is a cross-sectional similar to FIG. 2 showing a removable, adjustable shutter inserted into the coil winding measuring device of the invention.

As shown in FIGS. 1-3, the light directing chamber 5 includes a shutter receiving means 21. The shutter receiving means is defined by a cavity or recessed portion 22 formed within a side wall of chamber 5 and an elongated aperture or slot 23, extending through a wall 20A of duct 19 communicates with the recessed portion 22 of the shutter receiving means. Shown more clearly in FIG. 3, recessed portion 22 accommodates the holder portion 25 of a removable adjustable shutter 24, and slot 23 accommodates the profile portion 26 of the shutter. Walls 22A, forming the recessed portion of the shutter receiving means 21, and slot 23, being adapted to conform closely to the profile portion 26 of the adjustable shutter 24, shield the interior of duct 19 from ambient light which would affect the readout on meter 18.

Figure 4:
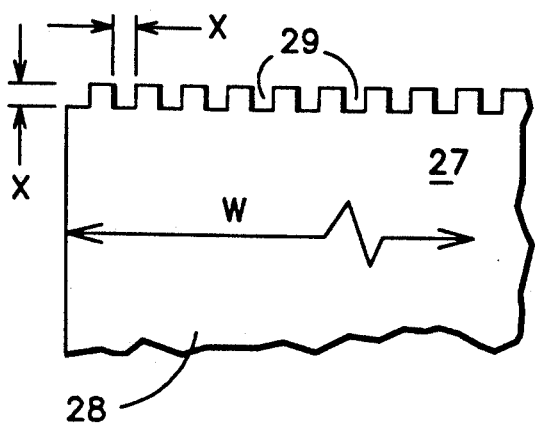
FIG. 4 is a fragmentary view showing a portion of a calibration shutter.
Figure 5:
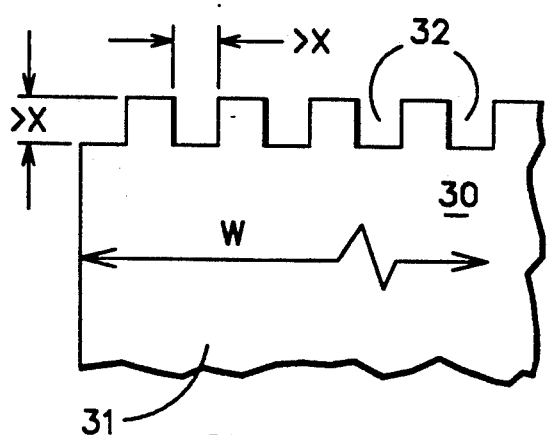
FIG. 5 is a fragmentary view showing a portion of a second calibration shutter.

Calibration shutters 27 and 30, shown in FIGS. 4 and 5 of the drawings, are used to adjust the coil winding measuring device 1 to the winding tolerances of any given sheet rolling mill. Shutter 27 is used to set meter 18 to a readout which indicates an acceptable winding tolerance for the mill and comprises a planer, opaque surface 28 to block the light 13 being directed toward solar cell 14, and notches 29 spaced along the length of one edge of the shutter. Notches 29, having a depth and width "X", are spaced apart at a distance which will allow a predetermined amount of light to pass by the opaque surface 28 and continue on through aperture 9 and onto solar cell 14. Likewise, shutter 30 is used to set meter 18 to a readout which indicates an unacceptable winding tolerance for the sheet rolling mill. Shutter 30 also comprises a planer, opaque surface 31 and notches 32. Notches 32 have a depth and width $>$ "X" and are spaced apart at a distance which will allow a predetermined amount of light 13 to fall onto solar cell 14.

OPERATION

Before measuring the quality of the coil windings on the finished coiled sheet product, the coil winding measuring device 1, of the preferred embodiment, must first be calibrated to the winding tolerances of the mill. To accomplish this, the power to the light source and light measuring means is switched on and calibration shutter 27, which sets the acceptable winding tolerance for the mill, is inserted into the shutter receiving means 21. Shutter 27 extends into the interior portion of duct 19, via slot 23, and notches 29 are positioned adjacent wall 20B of the light directing duct. Width W of shutter 27 is equal to the width W' of slot 23 and with the exception of the light passing through notches 29, the opaque surface 28 of the shutter, effectively blocks the light 13 being directed to solar cell 14. Meter 18 is then set to indicate the level of the amplified current, for example to read 1, which represents the preferred coil winding quality of the mill and shutter 27 is removed from the coil winding measuring device.

Likewise, calibration shutter 30, which sets the unacceptable coil windings of the mill, is inserted into the shutter receiving means 21 with its larger notches 32 positioned adjacent wall 20B. Width "W" of shutter 30 is also equal to width W' of slot 23 and only the light 13 passing through notches 32 can reach the solar cell 14.

Meter 18 is set to indicate the level of the amplified current, for example to read 2, and this reading indicates the unacceptable limit of the winding tolerance range for the mill. Shutter 30 is removed coil winding measuring device to complete the calibration operation.

Figure 6:
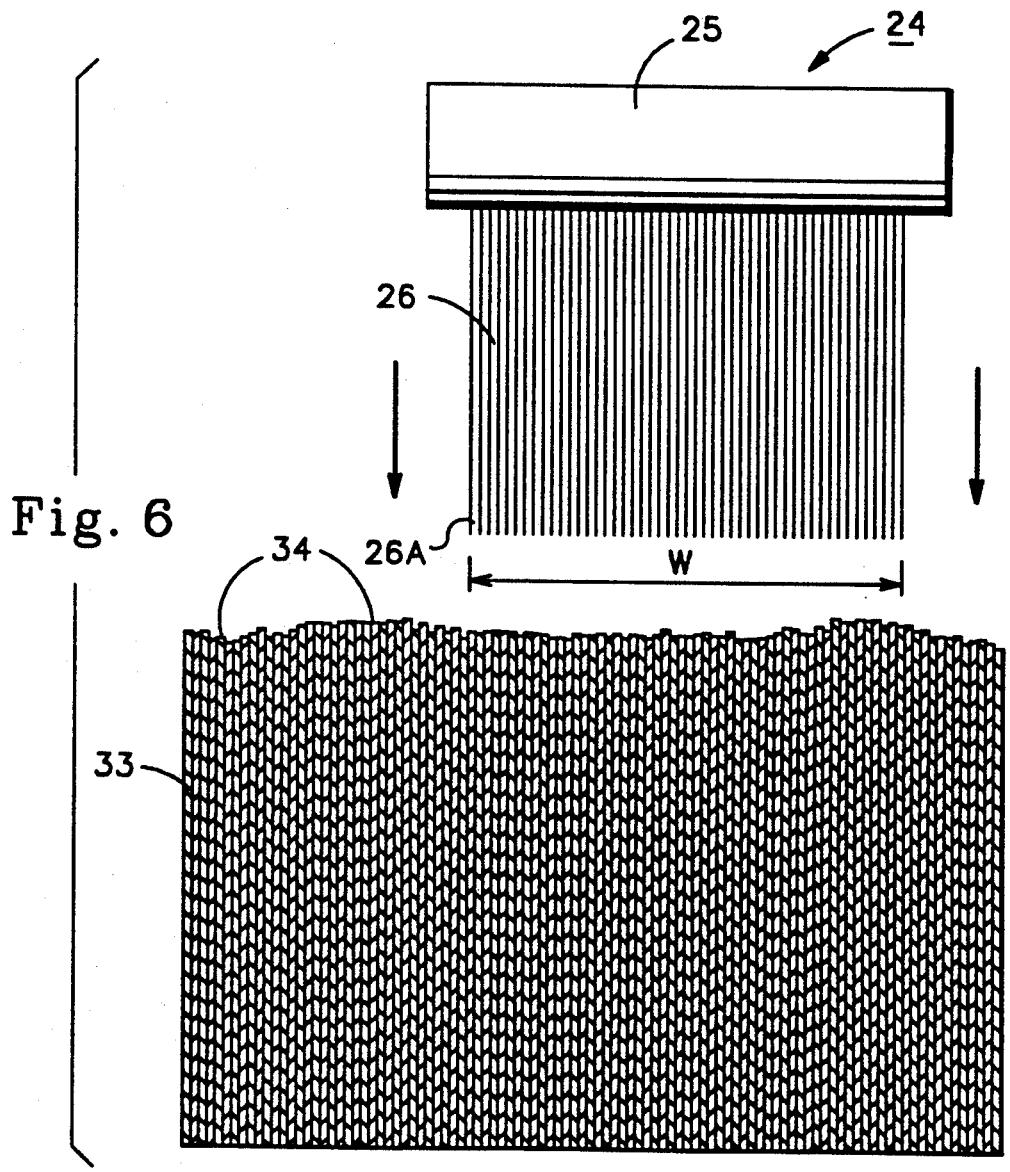
FIG. 6 shows a section of coiled sheet product and a removable, adjustable shutter.

To measure the quality of the windings on a finished coil 33, shown in FIG. 6 of the drawings, an adjustable shutter 24, which can be a profile copier such as the type carpenters use, is pressed against an end portion of coil 33 to cause the profile portion 26 of adjustable shutter 24 to conform to the profile of the lap to lap variations 34 of the windings. The adjustable shutter 24 is then inserted into receiving means 21, as shown in FIG. 3, with the leading end 26A of the profile portion 26 adjacent wall 20B. Width "W" of the profile portion 26 is also equal to width W' of slot 23 and only light 13 passing through openings 35, caused by the lap to lap variations of the copied profile of the coil winds, reaches the light measuring means within chamber 4.

If the coil winding profile copied onto the adjustable shutter 24 gives a meter reading of between 1 and 2, the sheet product is correctly aligned with the mill and acceptable coiled sheet product is being produced. However, if the meter reading is $>2$, the lap to lap variations between the windings on the finished coiled product is unacceptable and the product must be realigned with the mill equipment.

While this invention has been illustrated and described in accordance with a preferred embodiment, it is recognized that variations and changes may be made therein without departing from the invention as set forth in the claims.

I claim:

1. Apparatus for measuring lap to lap variations between windings of coiled material comprising: a light source housed within a first chamber, a light measuring means housed within a second chamber, and a light directing chamber positioned between said first chamber and said second chamber, said light directing chamber encasing a light directing duct extending between said light source and said light measuring means, said light directing duct including a slot adapted to provide means for inserting a shutter into an interior portion of said light directing duct, said shutter including an adjustable profile portion capable of conforming to the lap to lap variations of said windings.

2. The apparatus as described in claim 1 wherein said first chamber includes a panel having at least one aperture communicating with said light directing duct.

3. The apparatus as described in claim 1 wherein said second chamber includes a panel having at least one aperture communicating with said light directing duct.

4. The apparatus as described in claim 1 wherein said light directing chamber includes a cavity formed within one wall thereof, said cavity adapted to receive said shutter.

5. The apparatus as described in claim 4 wherein the slot of said light directing duct communicates with the cavity formed within said light directing chamber wall.

* * * * *